United States Patent
Gu et al.

(10) Patent No.: US 10,896,197 B1
(45) Date of Patent: Jan. 19, 2021

(54) EVENT DETECTION SYSTEM

(71) Applicant: Snap Inc., Santa Monica, CA (US)

(72) Inventors: Yupeng Gu, Los Angeles, CA (US);
Xiaolin Shi, Santa Monica, CA (US);
Jie Luo, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 143 days.

(21) Appl. No.: 16/057,565

(22) Filed: Aug. 7, 2018

Related U.S. Application Data

(60) Provisional application No. 62/674,997, filed on May 22, 2018.

(51) Int. Cl.
| | |
|---|---|
| *G06F 16/26* | (2019.01) |
| *G06F 16/29* | (2019.01) |
| *G06F 16/438* | (2019.01) |
| *G06F 16/487* | (2019.01) |
| *G06F 16/48* | (2019.01) |
| *G06F 16/2457* | (2019.01) |
| *G06T 11/20* | (2006.01) |

(52) U.S. Cl.
CPC ........ *G06F 16/26* (2019.01); *G06F 16/24578* (2019.01); *G06F 16/29* (2019.01); *G06F 16/438* (2019.01); *G06F 16/487* (2019.01); *G06F 16/489* (2019.01); *G06T 11/206* (2013.01)

(58) Field of Classification Search
None
See application file for complete search history.

(56) References Cited

U.S. PATENT DOCUMENTS

| | | | | |
|---|---|---|---|---|
| 7,415,445 B2 * | 8/2008 | Forman | ................ | G06K 9/6228 706/20 |
| 8,634,662 B2 * | 1/2014 | Das | ................ | G06K 9/00677 382/225 |
| 2006/0080286 A1 * | 4/2006 | Svendsen | ................ | G06F 16/58 |
| 2006/0101377 A1 * | 5/2006 | Toyama | ................ | G06Q 30/02 717/104 |
| 2006/0190442 A1 * | 8/2006 | Limberger | ............ | G06F 16/907 |
| 2012/0251011 A1 * | 10/2012 | Gao | ........................ | G06F 16/58 382/224 |
| 2013/0332387 A1 * | 12/2013 | Mirra | ..................... | G06Q 40/00 705/36 R |
| 2014/0153837 A1 * | 6/2014 | Steiner | ................ | G06F 16/5866 382/218 |
| 2014/0188940 A1 * | 7/2014 | Bak | .................... | G06K 9/00771 707/793 |
| 2018/0025035 A1 * | 1/2018 | Xia | ..................... | G06F 16/2282 707/600 |
| 2018/0025093 A1 * | 1/2018 | Xia | ................... | G06F 16/90335 707/602 |
| 2019/0108283 A1 * | 4/2019 | Koolwal | ............. | G06F 16/9535 |

* cited by examiner

*Primary Examiner* — Richard L Bowen
(74) *Attorney, Agent, or Firm* — Schwegman Lundberg & Woessner, P.A.

(57) ABSTRACT

An event detection system is configured to access a repository that contains a collection of media content. The media content may for example include images, videos, audio clips, and the like, wherein the media content comprises features that include: tags (e.g., hashtags or other similar mechanisms to label and sort content); captions that comprises one or more words or phrases; continuous numerical values; geolocation data (e.g., geo-hash, check-in data, coordinates); as well as temporal data (e.g., timestamps).

20 Claims, 12 Drawing Sheets

600

```
┌─────────────────────────────────────────────────────────────┐
│   RECEIVING A CLUSTERING PARAMETER THAT COMPRISES A TEMPORAL │
│            THRESHOLD AND A GEOLOGICAL THRESHOLD              │
│                            602                               │
└─────────────────────────────────────────────────────────────┘
                              │
                              ▼
┌─────────────────────────────────────────────────────────────┐
│  EXTRACTING SECOND METADATA FROM A SECOND MEDIA CONTENT, THE │
│   SECOND METADATA COMPRISING SECOND GEOLOCATION DATA AND     │
│                    SECOND TEMPORAL DATA                      │
│                            604                               │
└─────────────────────────────────────────────────────────────┘
                              │
                              ▼
┌─────────────────────────────────────────────────────────────┐
│  ALLOCATING THE SECOND MEDIA CONTENT TO THE CONTENT GROUP OF │
│    THE FIRST MEDIA CONTENT BASED ON THE SECOND GEOLOCATION   │
│  DATA, THE SECOND TEMPORAL DATA, AND THE CLUSTERING PARAMETER│
│                            606                               │
└─────────────────────────────────────────────────────────────┘
```

DEFINING A CONTENT GROUP BASED ON THE GEOLOCATION DATA AND THE TEMPORAL DATA OF THE FIRST MEDIA CONTENT
702

ASSIGNING THE FIRST CONTENT FEATURE TO THE CONTENT GROUP
704

GENERATING A TABLE THAT DEPICTS THE CONTENT GROUP, THE TABLE INCLUDING THE FIRST CONTENT FEATURE
706

GENERATING A GRAPH THAT COMPRISES A FIRST AXIS, A SECOND AXIS, AND A THIRD AXIS, THE THIRD AXIS REPRESENTING FEATURE VALUES
802

EXTRACTING THE CONTENT FEATURE FROM THE FIRST MEDIA CONTENT
804

GENERATING A VECTOR VALUE BASED ON THE CONTENT FEATURE
806

ALLOCATING A LOCATION ALONG THE THIRD AXIS TO THE CONTENT FEATURE, THE LOCATION BASED ON THE VECTOR VALUE
808

1000

1002

LOCATION: INDIANAPOLIS
DATE: MAY 27, 2018

| CLUSTER 1<br>INDY | CLUSTER 2<br>COFFEE | CLUSTER 3<br>RACE | CLUSTER 4<br>INDY |
|---|---|---|---|
| CLUSTER 5<br>RACE | CLUSTER 6<br>INDY | CLUSTER 7<br>FIREWORKS | CLUSTER 8<br>SHOE |
| CLUSTER 9<br>BUSHES | CLUSTER 10<br>INDY | CLUSTER 11<br>RACE | CLUSTER 12<br>DRUM |
| CLUSTER 13<br>INDY | CLUSTER 14<br>LASER | CLUSTER 15<br>INDY | CLUSTER 16<br>COSBY |

*FIG. 10*

EVENT DETECTION SYSTEM

PRIORITY CLAIM

This application claims the benefit of priority of U.S. Provisional Application Ser. No. 62/674,997, filed on May 22, 2018, which is hereby incorporated by reference herein in its entirety

TECHNICAL FIELD

Embodiments of the present disclosure relate generally to computing technology and, more particularly, but not by way of limitation, to systems for identifying events based on content attributes of content.

BACKGROUND

Social media networks have experienced exponential growth in recent years as web-based communication platforms. Hundreds of millions of people utilize various forms of social media to view and distribute media content. Consequently, the resulting activities of users of the social media platforms are often measured or otherwise analyzed in order to identify trending topics. Specifically, user activity data may be retrieved through various Application Programming Interfaces (APIs), indexed, processed, and stored for further analysis.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 is a flowchart illustrating a method for clustering content based on clustering parameters, according to certain example embodiments.

FIG. 7 is a flowchart illustrating a method for generating a table that depicts events at a location, according to certain example embodiments.

FIG. 10 is a diagram depicting a table comprising a display of content features that represent an event at a location, according to certain example embodiments.

DETAILED DESCRIPTION

Figure 1:
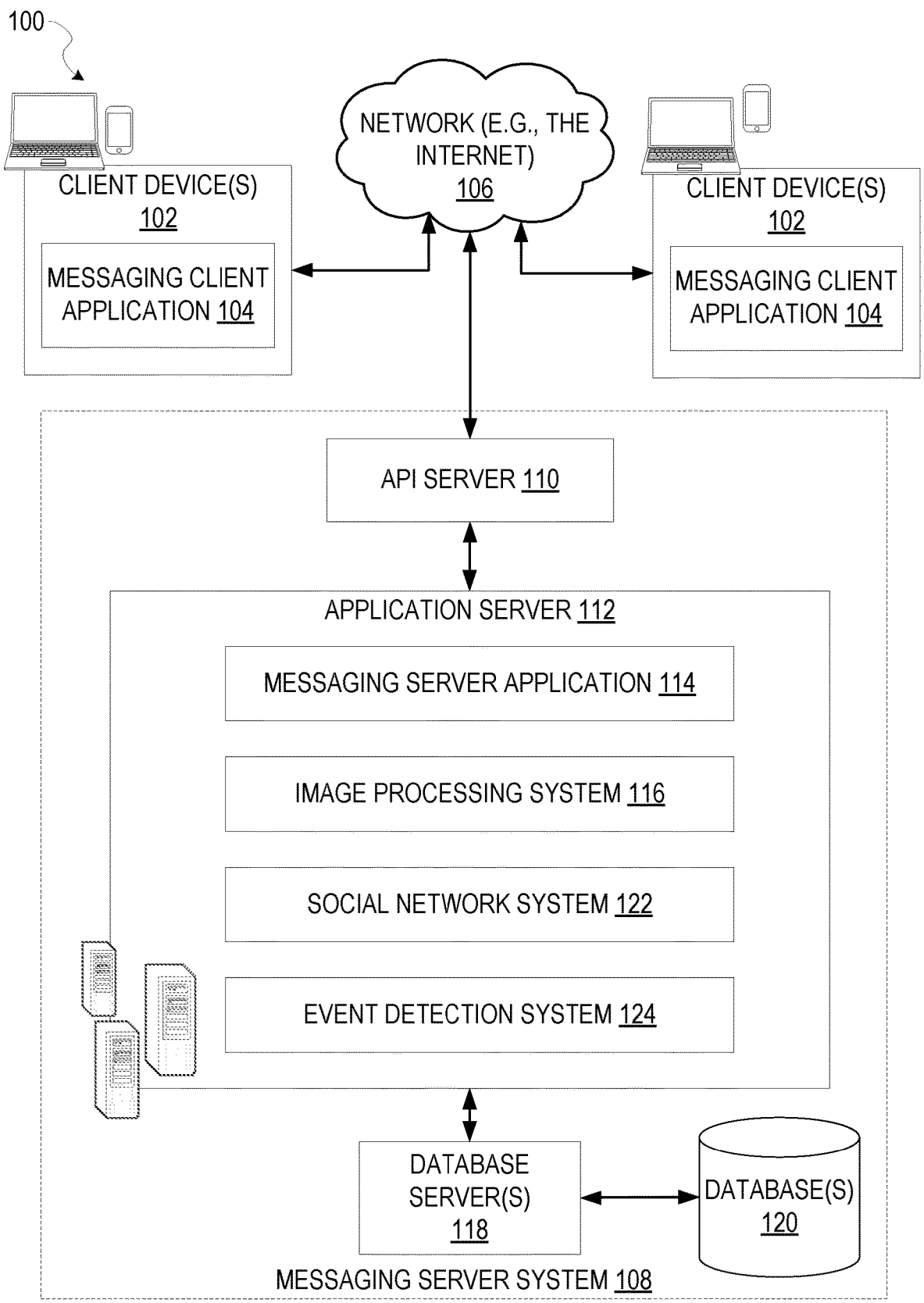
FIG. 1 is a block diagram showing an example messaging system for exchanging data (e.g., messages and associated content) over a network in accordance with some embodiments, wherein the messaging system includes an event detection system.

The approach is illustrated by way of example and not by way of limitation in the figures of the accompanying drawings, in which like references indicate similar elements. It should be noted that references to "an" or "one" or "some" embodiments in this disclosure are not necessarily to the same embodiment, and such references mean at least one.

A new approach is proposed that contemplates systems and methods to identify events that are the topic of content shared and viewed by users of a social network. An event detection system is configured to access a repository that contains a collection of media content. The media content may for example include images, videos, audio clips, and the like, wherein the media content comprises features that include: tags (e.g., hashtags or other similar mechanisms to label and sort content); captions that comprises one or more words or phrases; continuous numerical values; geolocation data (e.g., geo-hash, check-in data, coordinates); as well as temporal data (e.g., timestamps).

The first step in detecting events is constructing links between similar media content. Media content is assumed to be similar if they are created, or otherwise accessed and used at around the same time at nearby locations. The event detection system identifies groups of similar content among the collection of media content, based on similarities between corresponding geolocation data and temporal data associated with the content. Media content created at the same or nearly the same time, or at the same or nearly the same location, have a high likelihood of being related. The event detection system therefore groups together clusters of media content based on the corresponding geolocation and temporal data.

In some embodiments, "similarity" is further defined by a designation of temporal parameters and location parameters, wherein the temporal parameters include an interval of time (t_T) and the location parameters include a maximum geo-location distance (t_L) between any two points. Thus, picking a large t_T and t_L will result in larger clusters of media content, while a small t_T and t_L will result in smaller clusters of media content.

In response to clustering the media content, the event detection system extracts features from the clusters of media content, and designates the features to corresponding feature categories. The temporal trends and geological proximity of certain clusters of features may therefore be representative of an event. For example, a first cluster of content may comprise content that includes a first set of features. The event detection system extracts the features from the cluster, and designates a feature category to include the first set of features. As discussed above, the features of the media content include: tags (e.g., hashtags or other similar mechanisms to label and sort content); captions that comprises one or more words or phrases; continuous numerical values;

geolocation data (e.g., geo-hash, check-in data, coordinates); as well as temporal data (e.g., timestamps).

The event detection system generates a graph to represent a latent three-dimensional (3D) space, wherein the graph comprises an X, Y, and Z axis. In some embodiments, the X axis represents temporal values, the Y axis represents location values, and the Z axis represents feature values. Because clusters of media content are presumed to be similar, the associated features of the media content among the content should also have similar representations in the latent 3D space, along the Z-axis. Thus, in response to extracting the first set of features from the cluster of content, the event detection system allocation a region of the Z axis to the first set of features, and assigns the region a value.

The cluster of content may thereby be plotted and represented in the 3D space based on corresponding geolocation data, temporal data, and content features. Clusters of content may thus be identified, such that each cluster is presumed to relate to the same or a similar event. The content may also form clusters that may only be identified based on a perspective of the graph. For example, by viewing the graph from the perspective of the Y-axis and the Z-axis alone, a number of clusters may be depicted, and similarly, another set of clusters may be depicted from the perspective of the X-axis and Z-axis. Based on heuristics, two pieces of media content are assumed to be "similar" if they happen at the same time and at nearby locations. The two pieces of media content would therefore have similar representations within the 3D space.

Network Regularization

In some embodiments, the representation of media content "C" is characterized by the average of its associated features (e.g., tags, captions, continuous numerical values), as:

$$x = 1/D_x \Sigma_{t \in D_x} e_t$$

Where $e_t$ is the vectorized representation of tag/entity t, and $D_x$ is the set of tags/entities associated with the content C. For each content pair "i" and "j," denote their representations as $x_i$ and $x_j$ respectively. As per the traditional network embedding models, the probability of observing an edge between i and j as sigmoid($x_i \cdot x_j$). The absence of an edge will happen with probability of $1-p_{ij}$, wherein "sigmoid" is the sigmoid function:

$$\text{sigmoid}(x) = 1/(1+e^{-x}).$$

Clustering Cost

For a given cluster of media content "K," the center may be defined as the average of all media content that comprises the cluster K, which may be represented as:

$$c_k = 1/c_k \Sigma_{st \in Ck} x_i$$

The cluster assignment of media content $s_i$ (denoted as $ca_i$) is represented as:

$$ca_i = \arg\min_k \|x_i - c_k\|_2$$

Ideally, each cluster should be as coherent as possible, while isolated enough to be differentiated from other clusters. The average of all points of any given cluster is defined as the center of the cluster. Coherence is measured by the mean distance from every point of a cluster (where every point represented a distinct piece of content) to the center of the cluster ("intra-cluster distance"). Denoting the center of cluster k as $c_k$, then the distance within the cluster k is defined as:

$$d_k^{intra} = \Sigma_{st \in Ck} x_i$$

The overall intra-cluster distance is thus the summation over all clusters:

$$d^{intra} = \Sigma_{k=1}^k d_k^{intra} = \Sigma_{k=1}^k \Sigma_{i \in Ck} \|x_i - c_k\|^2$$

The inter-cluster distance is defined as the summation of pairwise center distance between every pair of clusters:

$$d^{intra} = \Sigma_{i,j: i \neq j} \|c_i - c_j\|^2$$

The total clustering cost will be a weighted average of the two terms.

Putting them together, the objective is a weighted sum of the costs above, where the weights are model hyper-parameters, indicating how much emphasis is placed on each component. In some embodiments, we seek to minimize the objective function below:

$$\min -\Sigma_{i,j} \log(p_{ij}^{Yij} \cdot (1-p_{ij})^{1-Yij}) + \mu \cdot (d^{intra} - \lambda \cdot d^{inter})$$

Where $\mu$ and $\lambda$ greater than 0 are two hyper-parameters.

Optimization & Implementation

In some embodiments, the objective function are optimized with respect to model parameters, i.e., the vector embedding for tags and entities from captions Standard iterative optimization algorithms can be applied.

Generalization to Continuous Features

The attributes of content may also be continuous numerical values. Mapping discrete attributes to their embeddings may be treated as a one-layer neural network with lookup vectors as the weight matrix and one-hot sparse encoding as features. Therefore it is natural to generalize this concept to continuous vectors, by (1) concatenating the discrete (one-hot) and continuous attributes at the raw-feature level, and force the weight matrix to be quasi-diagonal; or (2) concatenate the vectors at the output layer, where the discrete and continuous components are treated separately from each other. Mathematically they will be the same.

Evaluation

East cluster contains events of a certain type. Since specific meanings are not assigned to each latent dimension, in some embodiments we may assume that the type of the event is defined as the most frequent feature (i.e., tag, caption, etc.) in media content that comprises a cluster. In order to reduce the signal from less informative words (e.g., a, and, the, of, etc.) we may use a TF-IDF, a weighted sum of word frequencies when counting the occurrences of keywords. Since features of media content may include free text inputs (e.g., captions), there may be a lot of noise that could negatively effect the evaluation. In some embodiments, "stop-words" as well as words that are shorter than three Unicode characters are removed from all text based features.

Thus, in such embodiments, a weighted sum of features may be calculated for each cluster, and an event type may be determined for the cluster based on the most frequent feature, based on the weighted sum. The event type may thereby be assigned to the corresponding cluster.

Since the "ground truth" labels of an event type are rather subjective and sparse, we will mainly focus on the case studies on the results in terms of evaluating the model. We investigate the following two aspects: 1) what is the type of the event, or as a more specific example, "is this event a concert of protest?" The type of event is one possible output; and 2) what specific keywords or anomalies are associated with the event. For example, given the event is a basketball game, which teams are playing? Who is winning? These are another possible output.

The first set of keywords may be identified by the major clusters. Major clusters may contain stories about the same type of event, and the event can be found by various statistics of the cluster. Weighted count of tags seems like a reasonable measure for now. Cluster density is another metric to be considered, since content about an event tend to highly correlate with each other both temporally and geologically.

The second set of keywords may be characterized by the anomalies in the tag embedding space. The intuition is these keywords should be highly distinguished from the background words (which stay around the origin in the embedding space). Another approach may be to find the tags (i.e., feature values) that are far away from every cluster center.

The event detection system reports the most frequent keywords (i.e., content) from each cluster in a table that represents a particular region or location. For example, a table may be generated to depict keywords related to a particular location. The most frequent keyword from each cluster located within the particular location, and received during a temporal period may be displayed. By reviewing the table, an event may be inferred.

For example, a table may be assembled to depict a particular city (e.g., Indianapolis, Ind.) on a particular day (e.g., May 27, 2018). The event detection system may access a content repository that includes content received from the location and during the time, and identify clusters of content based on the metadata of the content (e.g., the geolocation and temporal data). Having clustered the content based on the metadata, a table may be generated wherein the table comprises a display of the most frequent keyword of each cluster. By reviewing the table, a user may identify the most common keywords from each cluster in order to infer an event.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content (including content features), client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an event detection system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
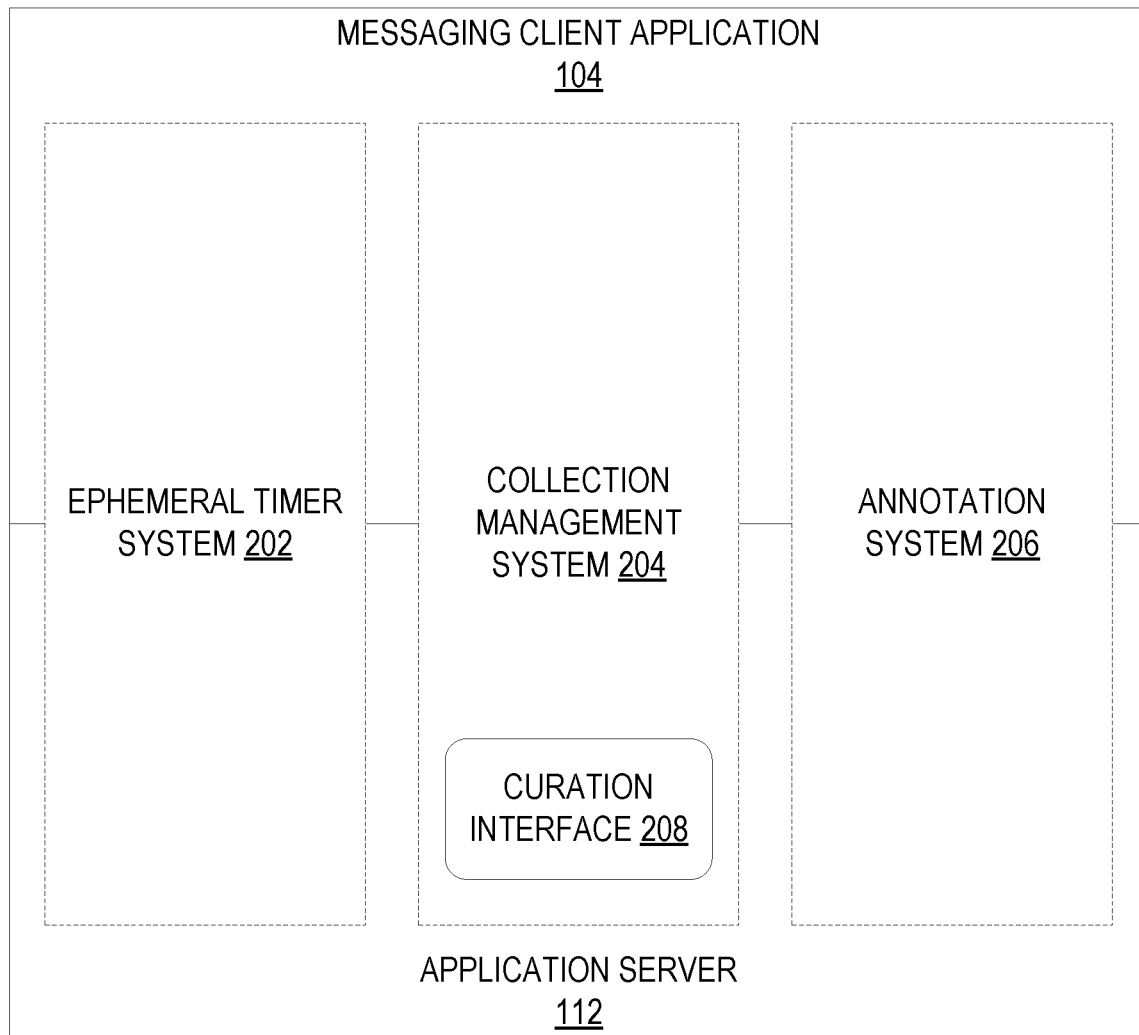
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
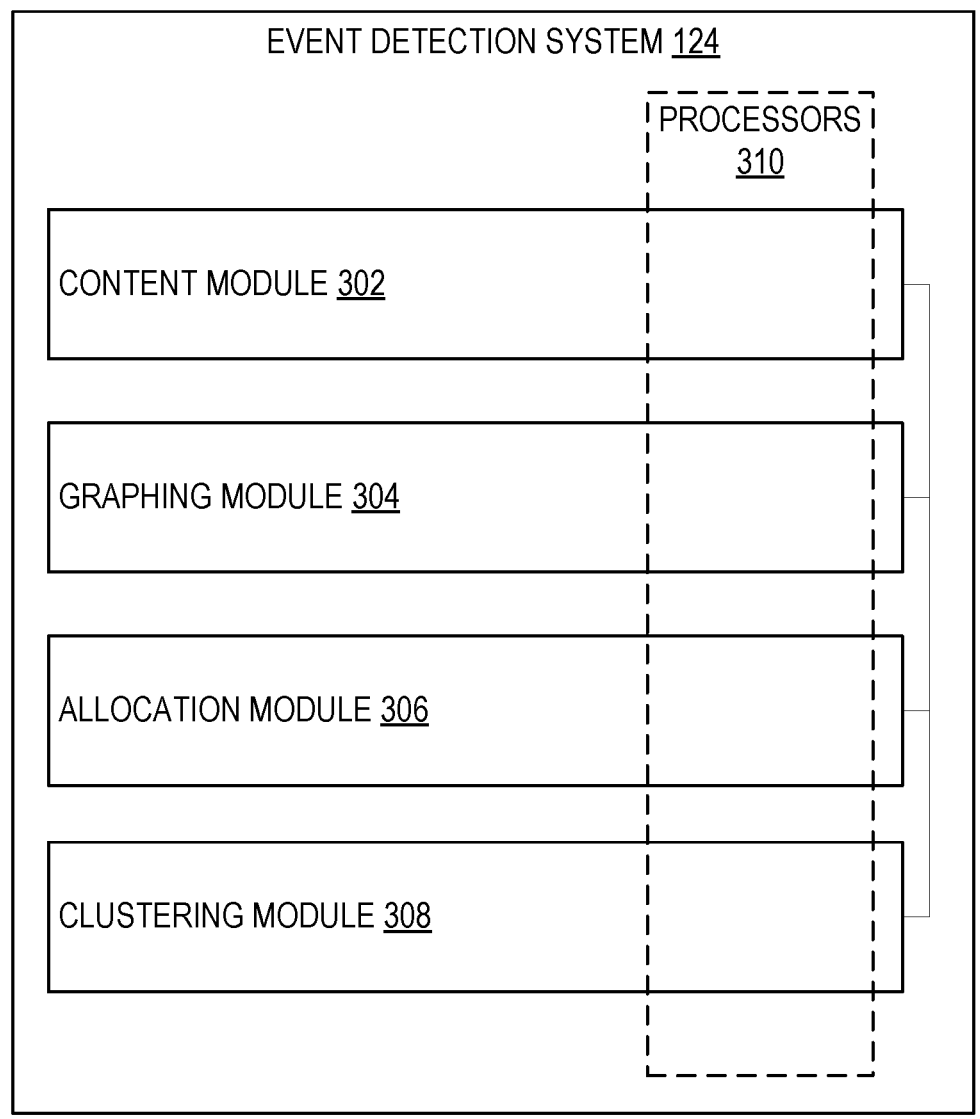
FIG. 3 is a block diagram illustrating various modules of an event detection system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the event detection system 124 that configure the event detection system 124 to access a repository that comprises a collection of content, identify clusters of similar content within the collection of content based on temporal and geolocation data, generate a graph that comprises an X-axis, a Y-axis, and a Z-axis, wherein the X and Y axis correspond to temporal and geolocation values, and the Z axis corresponds to feature values, extract content features from each of the clusters of content, and allocate regions of the Z-axis to the extracted content features from each of the clusters of features, in order to plot vector representations of the content on the 3D graph, according to certain example embodiments. The event detection system 124 is shown as including a content module 302, a graphing module 304, an allocation module 306, and a clustering module 308, all configured to communicate with each other (e.g., via a bus, shared memory, or a switch). Any one or more of these modules may be implemented using one or more processors 310 (e.g., by configuring such one or more processors to perform functions described for that module) and hence include one or more of the processors 310.

Any one or more of the modules described may be implemented using hardware alone (e.g., one or more of the processors 310 of a machine) or a combination of hardware and software. For example, any module described of the event detection system 124 may physically include an arrangement of one or more of the processors 310 (e.g., a subset of or among the one or more processors of the machine) configured to perform the operations described herein for that module. As another example, any module of the event detection system 124 may include software, hardware, or both, that configure an arrangement of one or more processors 310 (e.g., among the one or more processors of the machine) to perform the operations described herein for that module. Accordingly, different modules of the event detection system 124 may include and configure different arrangements of such processors 310 or a single arrangement of such processors 310 at different points in time. Moreover, any two or more modules of the event detection system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
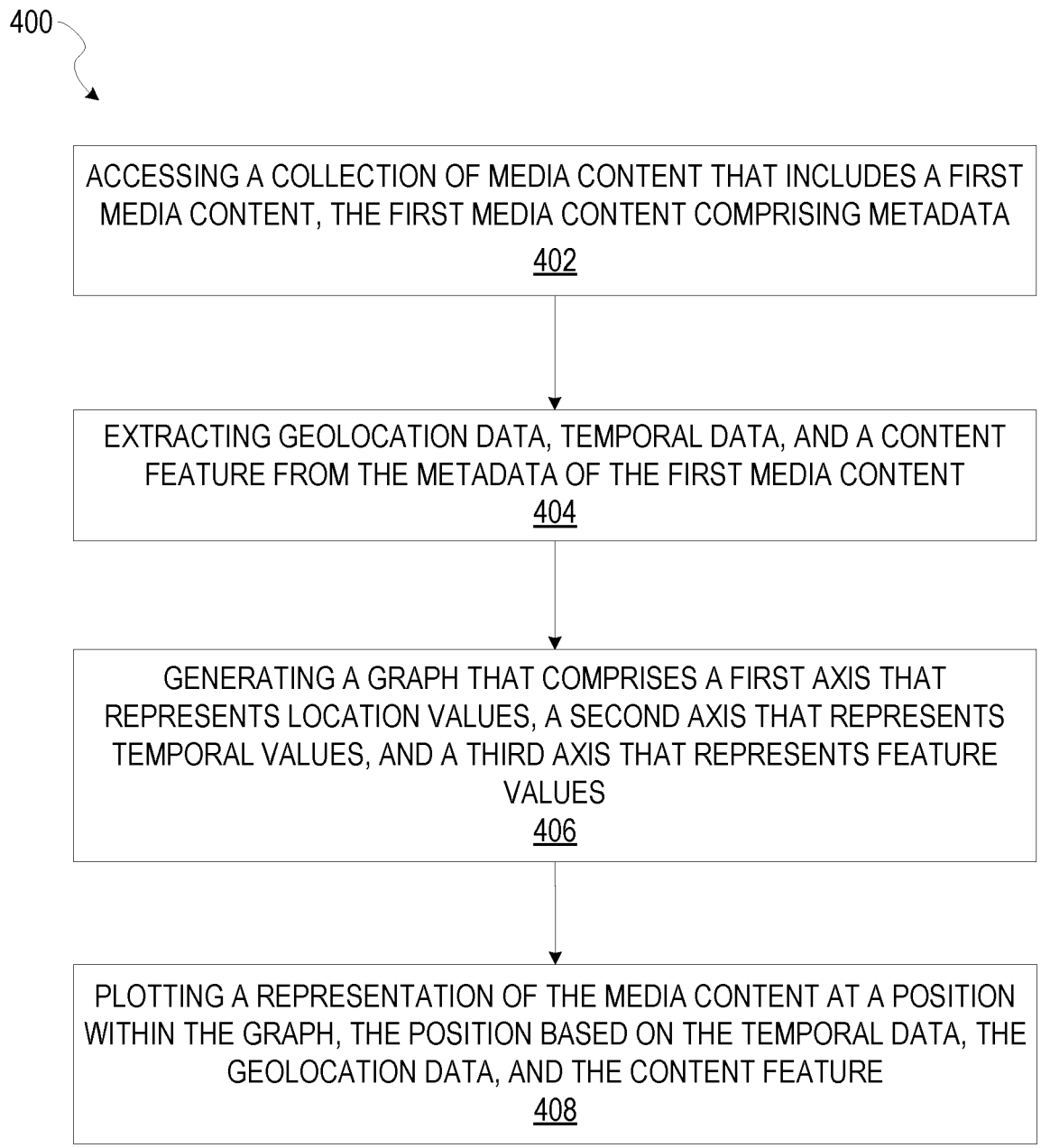
FIG. 4 is a flowchart illustrating a method for plotting a representation of media content within a three-dimensional graph, according to certain example embodiments.

FIG. 4 is a flowchart illustrating a method 400 for plotting a representation of media content within a three-dimensional graph, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the content module 302 accesses a repository that comprises a collection of content, such as media content. The media content comprises metadata that includes content features, as discussed above. For example, the content features include text strings such as tags (e.g., hashtags or other similar mechanisms to label and sort content); captions that comprises one or more words or phrases; continuous numerical values; geolocation data (e.g., geo-hash, check-in data, coordinates); as well as temporal data (e.g., timestamps).

At operation 404, the content module 302 extracts the metadata that includes the geolocation data and the temporal data from the media content. The geolocation data, and the temporal data may each define a geolocation value and a temporal value.

At operation 406, the graphing module 304 generates a graph that comprises a first axis that represents location values, a second axis that represents temporal values, and a third axis that represents feature values.

At operation 408, the graphing module 304 plots a representation of the media content at a position within the graph, wherein coordinates of the position of the representation are based on the temporal value, the geolocation value, and the content feature.

Figure 5:
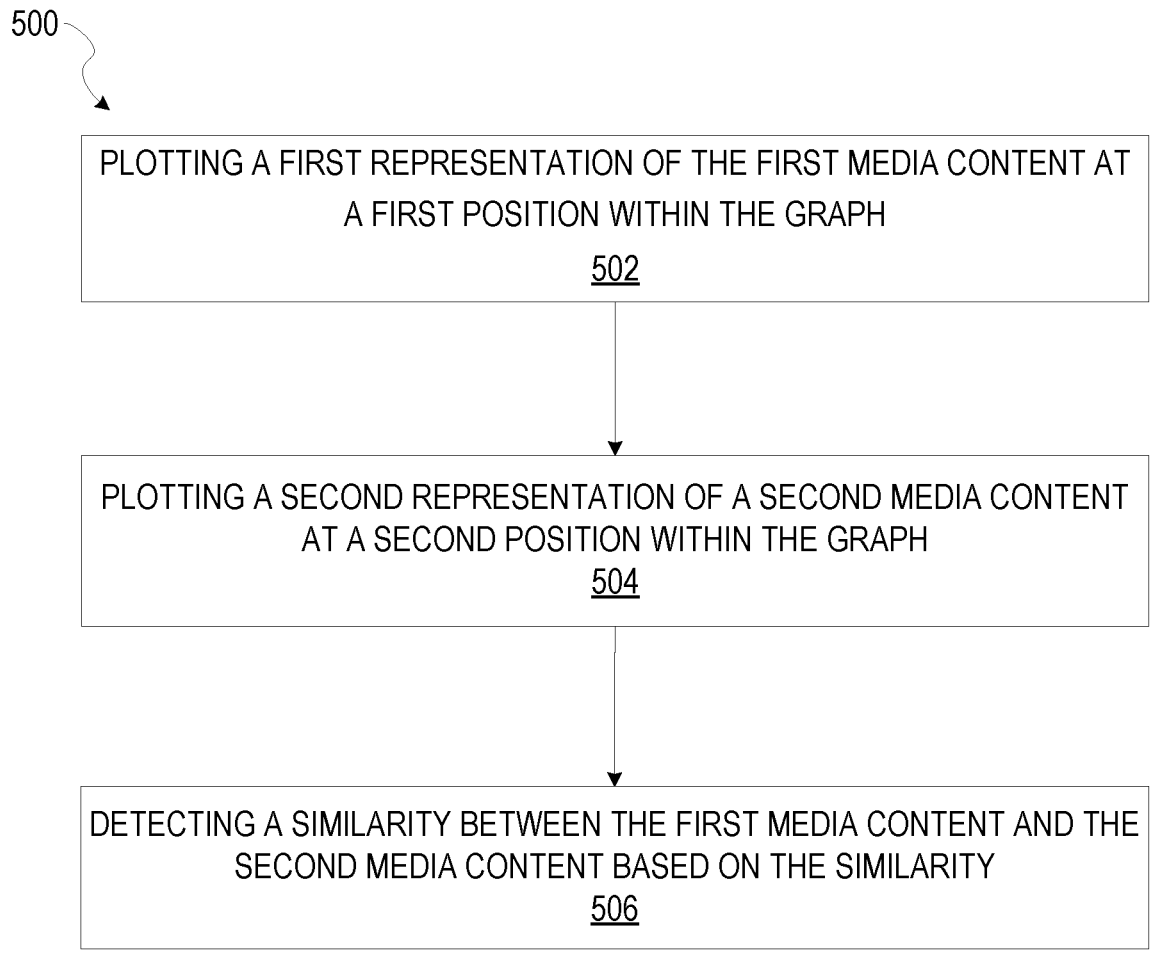
FIG. 5 is a flowchart illustrating a method for detecting similarities between media content, according to certain example embodiments.

FIG. 5 is a flowchart illustrating a method 500 for detecting similarities in media content, according to certain example embodiments. Operations of the method 500 may be performed by the modules described above with respect to FIG. 3. As shown in FIG. 5, the method 500 includes one or more operations 502, 504, and 506.

At operation 502, the graphing module 502 plots a first representation of a first media content at a first position within a three-dimensional graph, wherein the three-dimensional graph comprises a first axis that represents location values, a second axis that represents temporal values, and a third axis that represents feature values, and wherein coordinates of the first position are based on metadata of the first media content that includes geolocation data, temporal data, and a content feature.

At operation 504, the graphing module 502 plots a second representation of a second media content at a second position within a three-dimensional graph, wherein the three-dimensional graph, wherein coordinates of the second position are based on metadata of the second media content.

At operation 506, the clustering module 308 detects a similarity between the first media content and the second media content based on the first representation and the second representation. For example, as discussed in FIG. 6, the clustering module 308 may receive clustering parameters that define geological and temporal thresholds FIG. 6 is a flowchart illustrating a method 600 for clustering content based on clustering parameters, according to certain example embodiments. Operations of the method 600 may be performed by the modules described above with respect to FIG. 3. As shown in FIG. 6, the method 600 includes one or more operations 602, 604, and 606.

At operation 602, the clustering module receives clustering parameters that include a temporal threshold and a geological threshold.

At operation 604, the content module 302 extracts metadata from content accessed at a content repository. Based on the clustering parameters, the clustering module 308 may identify one or more clusters of content, wherein the geolocation data and temporal data of the content within a cluster are all within the threshold deviation from one another as defined by the clustering parameters.

At operation 608, based on the clustering of the content, the allocation module 306 allocates media content to a particular content group based on the metadata and the clustering parameters.

FIG. 7 is a flowchart illustrating a method 700 for generating a table that depicts events at a location, according to certain example embodiments. Operations of the method 700 may be performed by the modules described above with respect to FIG. 3. As shown in FIG. 7, the method 700 includes one or more operations 702, 704, and 706.

At operation 702, the content module 302 defines a content group based on geolocation data and temporal data. For example, in response to extracting the metadata from the first media content, as in operation 404 of the method 400, the content module 302 may define a content group based on the geolocation data and the temporal data extracted from the metadata of the media content.

At operation 704 the allocation module 306 allocates content features from content received at the same time and location defined by the content group to the content group.

At operation 706, the graphing module 304 generates a table to depict the content group, wherein the tables includes all content features assigned to the content group. Consider table 1002 of FIG. 10 as an illustrative example.

Figure 8:
FIG. 8 is a flowchart illustrating a method for allocating feature values to an axis of a graph, according to certain example embodiments.

FIG. 8 is a flowchart illustrating a method 800 for allocating features values to an axis of a graph, according to certain example embodiments. Operations of the method 800 may be performed by the modules described above with respect to FIG. 3. As shown in FIG. 8, the method 800 includes one or more operations 802, 804, 806, and 808.

At operation 802, as in operation 406 of the method 400, the graphing module 304 generates a graph that comprises a first axis that represents location values, a second axis that represents temporal values, and a third axis that represents feature values.

At operation 804, the content module 302 extracts metadata that include geolocation data, temporal data, and at least a content feature from a media content. For example, the content feature may include a text string.

At operation 806, the content module 302 generates a vector value based on the text string. In some embodiments, the value of the content feature may be based on the term frequency-inverse document frequency (tf-idf) of a given content feature. The tf-idf is a numerical statistic that is intended to reflect how important a word is to a document in a collection or corpus. It is often used as a weighting factor in searches of information retrieval, text mining, and user modeling. The tf-idf value increases proportionally to the number of times a word appears in the document and is offset by the frequency of the word in the corpus, which helps to adjust for the fact that some words appear more frequently in general.

At operation 808, the graphing module 304 allocates a location along the third axis to the content feature, wherein the location is based on the vector value calculated in operation 806.

Figure 9:
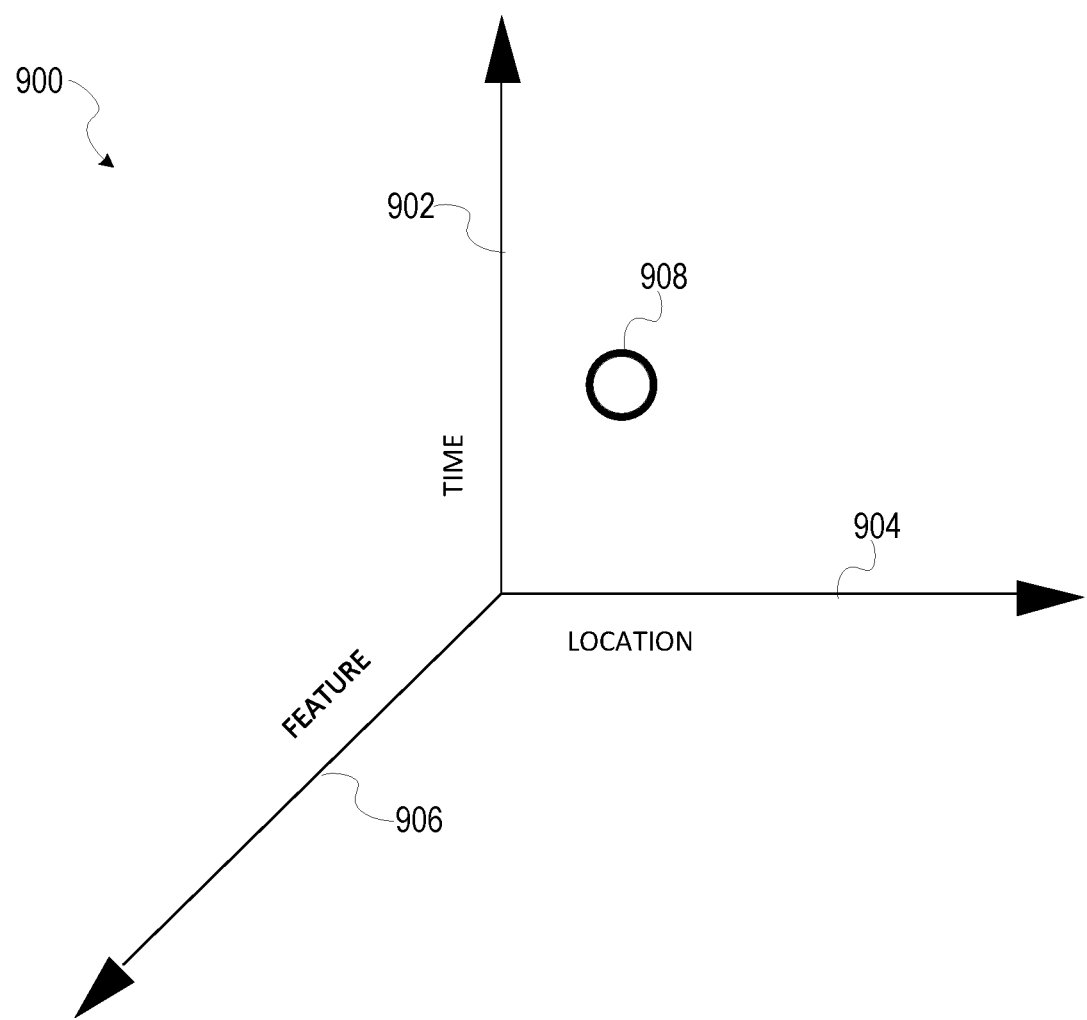
FIG. 9 is a diagram depicting a three-dimensional graph for identifying clusters of similar content, according to certain example embodiments.

FIG. 9 is a diagram depicting a three-dimensional (3D) graph 900 for identifying clusters of similar content, according to certain example embodiments. As seen in FIG. 9, the 3D graph comprises a Y-axis 902, an X-axis 904, and a Z-axis 906, wherein the Y-axis 902 comprises a set of temporal values, the X-axis 904 comprises a set of location values, and the Z-axis 906 comprises a set of feature values.

As seen in the 3D graph 900, a representation of media content 908 may be depicted as a point in the 3D space represented by the graph 900.

FIG. 10 is a diagram 1000 depicting a table 1002 comprising a display of content features that represent an event at a location, according to certain example embodiments. As seen in the diagram 1000, the table 1002 may include a display of content features representing clusters of content received from a particular location and time.

For example, a user may provide an input to define a location and time, and in response, the event detection system 124 may perform one or more of the methods described in FIGS. 4, 5, 6, 7, and 8, and generate the table 1002. The table 1002 therefore provides a visualization of clusters of content, enabling the user to infer an event based on the most common keywords (i.e., content) displayed. Based on a review of the table 1002, a user may therefore infer that the content "INDY," and "RACE" appear most frequently in various clusters based on the corresponding geolocation and temporal data.

Software Architecture

Figure 11:
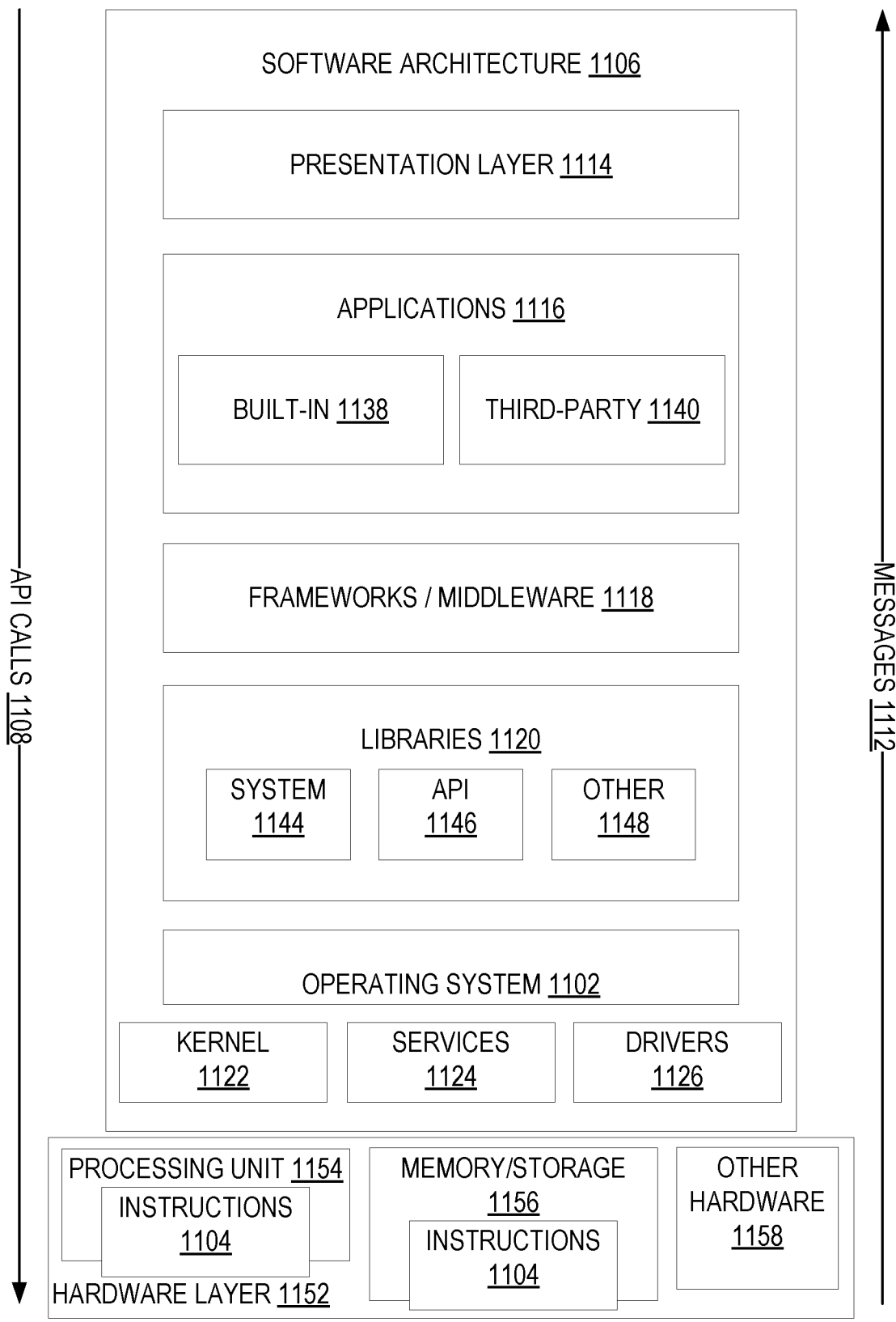
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as the machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
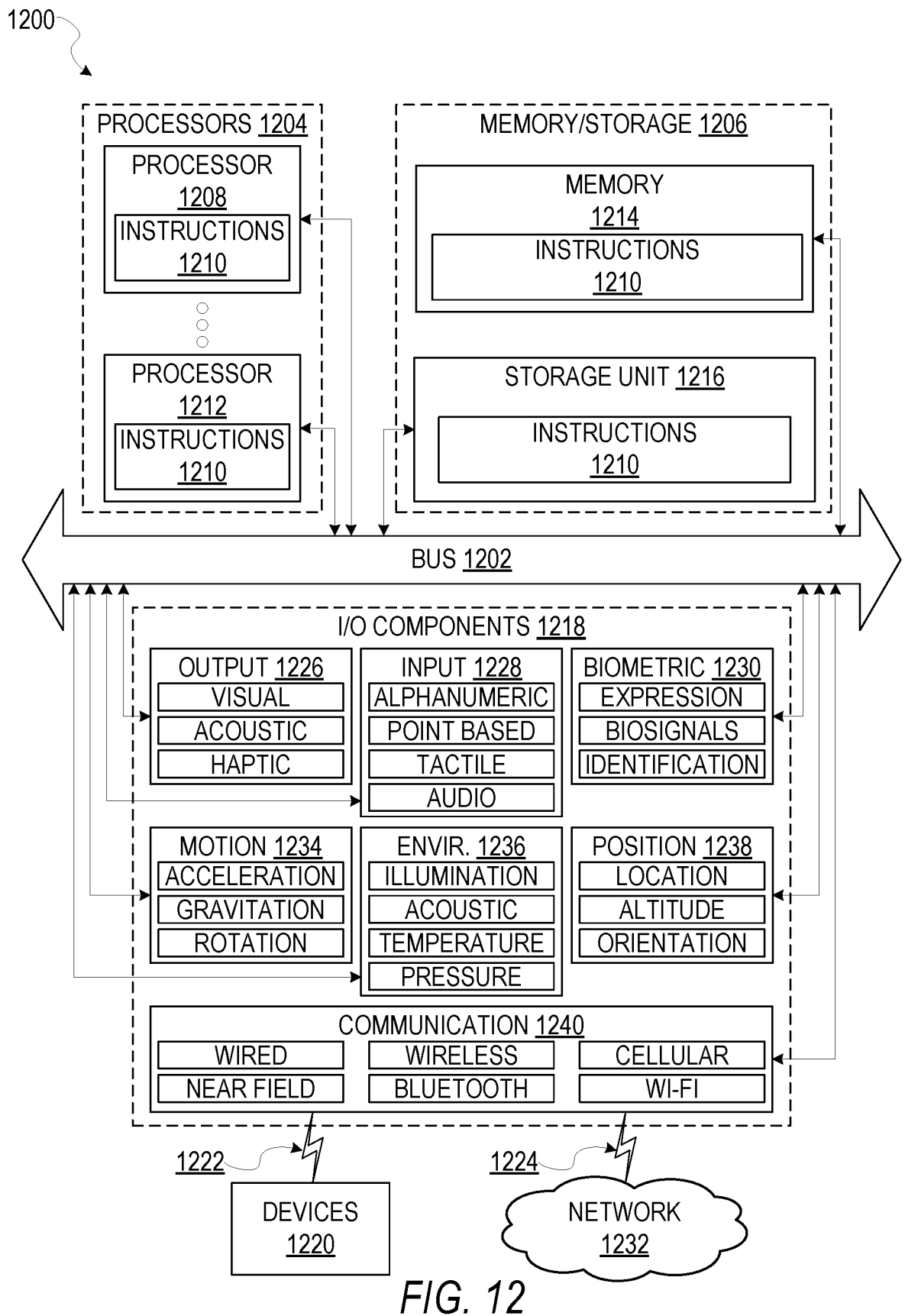
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system comprising:
   a memory; and
   at least one hardware processor coupled to the memory and comprising instructions that causes the system to perform operations comprising:

accessing a collection of media content, the media content among the collection of media content comprising metadata that includes geolocation data, temporal data, and content feature data;

grouping a subset of the collection of media content based on the temporal data and the geolocation data of the subset of the collection of media content, the subset of the collection of media content including at least a first media content;

extracting the content feature data from the subset of the collection of media content, the content feature data identifying a content feature;

generating a graph that comprises a first axis that represents location values, a second axis that represents temporal values, and a third axis that represents feature values;

designating the content feature to a position along the third axis; and plotting a representation of the first media content upon the graph based on the metadata of the first media content and the position of the content feature along the third axis.

2. The system of claim 1, wherein the metadata of the first media content is a first metadata that includes a first content feature, the representation of the first media content is a first representation at a first position within the graph, the collection of media content includes a second media content that comprises second metadata, and wherein the instructions further comprise:

extracting the second metadata from the second media content;

plotting a second representation of the second media content at a second position within the graph, the second position based on the second metadata; and detecting a similarity between the first media content and the second media content based on the first representation and the second representation.

3. The system of claim 2, wherein the instructions further comprise:

linking the first representation and the second representation within the graph in response to the detecting the similarity.

4. The system of claim 1, wherein the instructions further comprise:

generating a table based on the subset of the collection of media content, the table including a list of content features assigned to the content group, the list of content features including the content feature.

5. The system of claim 4, wherein the instructions further comprise:

determining an occurrence count of each content feature among the list of content features;

sorting the list of content features based on the occurrence counts of each of the content features; and displaying a top ranked content feature within the table.

6. The system of claim 1, wherein the generating the graph further comprises:

allocating a portion of the third axis to the content feature of the media content.

7. The system of claim 6, wherein the allocating the portion of the third axis to the content feature includes:

generating a vector value based on the text string;

identifying a location along the third axis based on the vector value; and allocating the location along the third axis to the content feature.

8. The system of claim 1, wherein the metadata of the first media content is a first metadata, the collection of media content includes a second media content that comprises second metadata, and the instructions further comprise:

receiving a clustering parameter that comprises a temporal threshold and a geological threshold;

extracting the second metadata from the second media content, the second metadata comprising second geolocation data, and second temporal data; and allocating the second media content to the content group of the first media content based on the second geolocation data, the second temporal data, and the clustering parameter.

9. A method comprising:

accessing a collection of media content, the media content among the collection of media content comprising metadata that includes geolocation data, temporal data, and content feature data;

grouping a subset of the collection of media content based on the temporal data and the geolocation data of the subset of the collection of media content, the subset of the collection of media content including at least a first media content;

extracting the content feature data from the subset of the collection of media content, the content feature data identifying a content feature;

generating a graph that comprises a first axis that represents location values, a second axis that represents temporal values, and a third axis that represents feature values;

designating the content feature to a position along the third axis; and plotting a representation of the first media content upon the graph based on the metadata of the first media content and the position of the content feature along the third axis.

10. The method of claim 9, wherein the metadata of the first media content is a first metadata that includes a first content feature, the representation of the first media content is a first representation at a first position within the graph, the collection of media content includes a second media content that comprises second metadata, and wherein the method further comprises:

extracting the second metadata from the second media content;

plotting a second representation of the second media content at a second position within the graph, the second position based on the second metadata; and detecting a similarity between the first media content and the second media content based on the first representation and the second representation.

11. The method of claim 10, wherein the method further comprises:

linking the first representation and the second representation within the graph in response to the detecting the similarity.

12. The method of claim 9, wherein the method further comprises:

generating a table based on the content group, the table including a list of content features assigned to the content group, the list of content feature including the content feature.

13. The method of claim 12, wherein the method further comprises:

determining an occurrence count of each content feature among the list of content features;

sorting the list of content features based on the occurrence counts of each of the content features.

14. The method of claim 9, wherein the generating the graph further comprises:
allocating a portion of the third axis to the content feature of the media content.

15. The method of claim 14, wherein the allocating the portion of the third axis to the content feature includes:
generating a vector value based on the text string;
identifying a location along the third axis based on the vector value; and
allocating the location along the third axis to the content feature.

16. The method of claim 9, wherein the metadata of the first media content is a first metadata, the collection of media content includes a second media content that comprises second metadata, and the method further comprises:
receiving a clustering parameter that comprises a temporal threshold and a geological threshold;
extracting the second metadata from the second media content, the second metadata comprising second geolocation data, and second temporal data; and
allocating the second media content to the content group of the first media content based on the second geolocation data, the second temporal data, and the clustering parameter.

17. A non-transitory machine-readable storage medium comprising instructions that, when executed by one or more processors of a machine; cause the machine to perform operations comprising:
accessing a collection of media content, the media content among the collection of media content comprising metadata that includes geolocation data, temporal data, and content feature data;
grouping a subset of the collection of media content based on the temporal data and the geolocation data of the subset of the collection of media content, the subset of the collection of media content including at least a first media content;
extracting the content feature data from the subset of the collection of media content, the content feature data identifying a content feature;
generating a graph that comprises a first axis that represents location values, a second axis that represents temporal values, and a third axis that represents feature values;
designating the content feature to a position along the third axis; and
plotting a representation of the first media content upon the graph based on the metadata of the first media content and the position of the content feature along the third axis.

18. The non-transitory machine-readable storage medium of claim 17, wherein the metadata of the first media content is a first metadata that includes a first content feature, the representation of the first media content is a first representation at a first position within the graph, the collection of media content includes a second media content that comprises second metadata, and wherein the instructions further comprise:
extracting the second metadata from the second media content;
plotting a second representation of the second media content at a second position within the graph, the second position based on the second metadata; and
detecting a similarity between the first media content and the second media content based on the first representation and the second representation.

19. The non-transitory machine-readable storage medium of claim 18, wherein the instructions further comprise:
linking the first representation and the second representation within the graph in response to the detecting the similarity.

20. The non-transitory machine-readable storage medium of claim 17, wherein the instructions further comprise:
generating s table based on the content group, the table including a list of content features assigned to the content group, the list of content feature including the a content feature.

* * * * *

UNITED STATES PATENT AND TRADEMARK OFFICE
CERTIFICATE OF CORRECTION

| | | |
|---|---|---|
| PATENT NO. | : 10,896,197 B1 | Page 1 of 1 |
| APPLICATION NO. | : 16/057565 | |
| DATED | : January 19, 2021 | |
| INVENTOR(S) | : Gu et al. | |

It is certified that error appears in the above-identified patent and that said Letters Patent is hereby corrected as shown below:

In the Claims

In Column 21, Line 30, in Claim 17, delete "machine;" and insert --machine,-- therefor In Column 22, Line 36, in Claim 20, delete "s" and insert --a-- therefor In Column 22, Line 39, in Claim 20, before "content", delete "a"

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*